J. C. DE JONG.
GREENHOUSE AND HORTICULTURAL FRAME.
APPLICATION FILED FEB. 6, 1920.

1,368,613.

Patented Feb. 15, 1921.
3 SHEETS—SHEET 1.

J. C. DE JONG.
GREENHOUSE AND HORTICULTURAL FRAME.
APPLICATION FILED FEB. 6, 1920.

1,368,613.

Patented Feb. 15, 1921.
3 SHEETS—SHEET 3.

UNITED STATES PATENT OFFICE.

JAN CORNELIS DE JONG, OF LANCING, ENGLAND.

GREENHOUSE AND HORTICULTURAL FRAME.

1,368,613.  Specification of Letters Patent.  Patented Feb. 15, 1921.

Application filed February 6, 1920. Serial No. 356,714.

*To all whom it may concern:*

Be it known that I, JAN CORNELIS DE JONG, a subject of the Queen of Holland, residing at Caswell, 1, The Terrace, Lancing, in the county of Sussex, England, (whose post-office address is Caswell, 1, The Terrace, Lancing, in the county of Sussex, England,) have invented certain new and useful Improvements in Greenhouses and Horticultural Frames, of which the following is a specification.

This invention has for its object to produce a greenhouse or horticultural frame in which the roof can be raised or lowered as desired.

According to this invention the roof is carried on beams pivoted to arms which are themselves pivotally mounted on projections on nuts working on right and left-handed screw-threaded shafts arranged horizontally at suitable distances for the entire length of the greenhouse or frame. The projections on the nuts carry wheels or antifriction rollers which run upon the ground or foundation of the structure.

If desired the threaded shafts of the structure may be coupled together, so as to be operated simultaneously, by means of worms and worm wheels or chains and sprocket wheels or other suitable mechanical means.

The side lights of the greenhouse or frame are carried in frames secured to each other by pins and slots so as to adjust themselves to the varying height of the structure; the light secured to the roof frame being outside while the others are secured inside the light above.

In the accompanying drawings—

Fig. 6 is a detail elevation of the right-hand part of Fig. 1, showing the side lights.

The same letters of reference where they occur are used to denote the same or corresponding parts in all three figures of the drawings.

Figure 1:
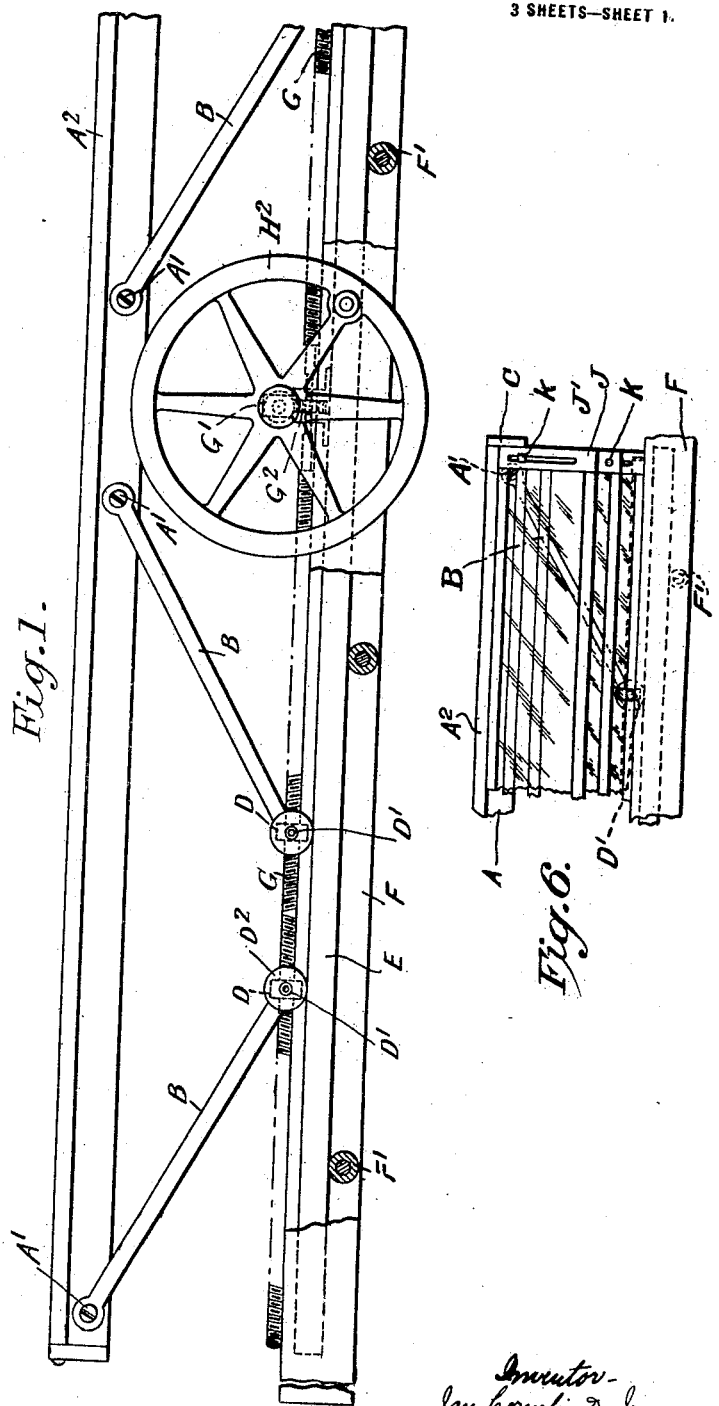
Figure 1 is a side elevation partially broken away and showing part of a greenhouse constructed according to my invention.

In these drawings A A represent the roof beams and B B the arms to which they are pivotally mounted at $A'$. C C represent transverse beams securing the roof beams together, and $A^2$ represent flanges or projections on the roof beams A to which the light frames J are secured so as to be clear of the raising and lowering gear.

The lower ends of the arms B are pivotally mounted on projections $D'$ on nuts D working on the shaft G. The said projections form spindles on which are loosely mounted wheels or antifriction rollers $D^2$ which run upon the foundation E of the structure. In the drawings the foundation plates E are mounted in a base F built upon the ground and provided with anti-friction rollers $F'$ mounted transversely therein so that the foundation plates and the structure carried thereby can be moved longitudinally on the base F when so desired.

The nuts D are arranged in pairs on right and left-handed screw-threaded shafts G mounted in suitable bearings horizontally and on each foundation plate of the greenhouse or frame.

Figure 2:
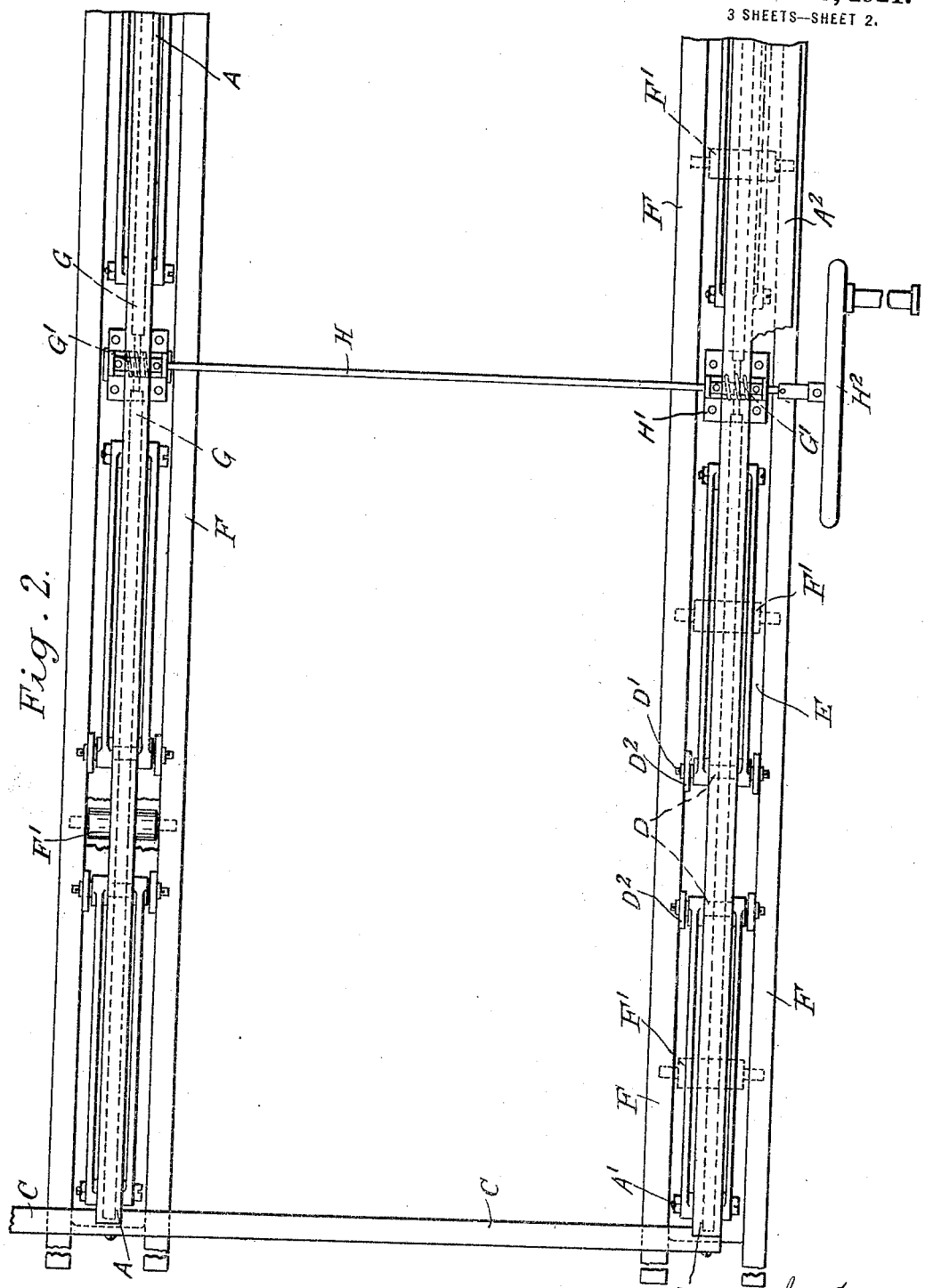
Fig. 2 is a plan of Fig. 1 also partially broken away.
Figure 3:
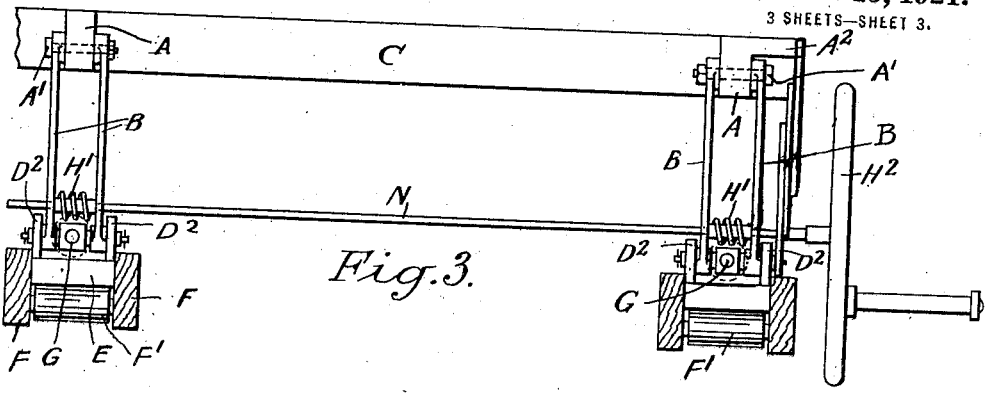
Fig. 3 is an end elevation of same.

In the form shown in Figs. 1 to 3 each rod G is mounted in bearings in a bracket $G'$ secured to the foundation plate E and has a worm wheel $G^2$ fast on the rod and between the cheeks of the bracket. These worm wheels $G^2$ are engaged by worms $H'$ on a transverse shaft H rotatably mounted in the brackets $G'$ and provided with a crank arm or wheel $H^2$ for operating it. But any other suitable means for gearing the rods G together to effect their simultaneous rotation to an equal extent so as to raise or lower the roof beams in a parallel plane and for rotating the rods may be adopted.

Figure 4:
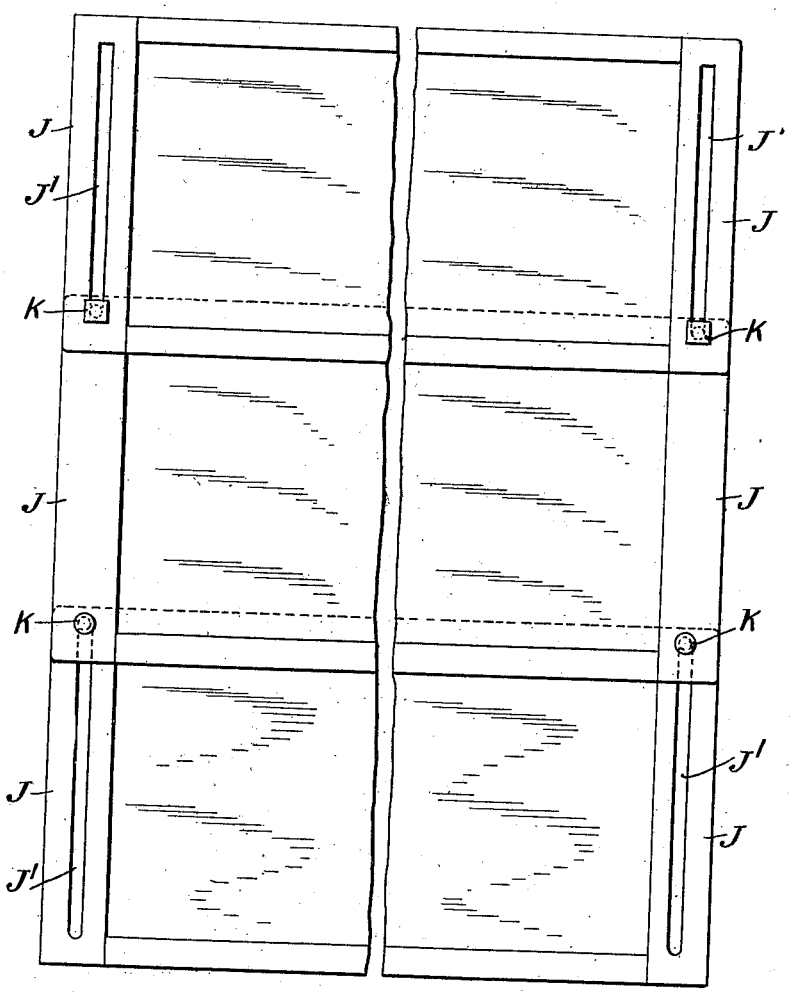
Figs. 4 and 5 are respectively front and end elevations on an enlarged scale showing three lights adapted for use at the sides of the structure shown in Figs. 1 to 3.
Figure 5:
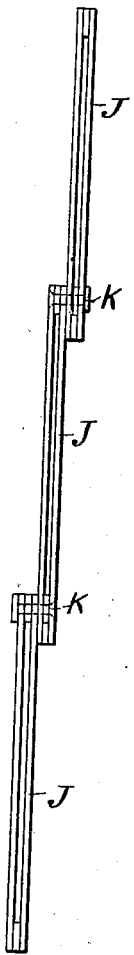

In Figs. 4 and 5 three lights are shown adapted to be used on a greenhouse or frame having a vertically movable roof. As shown the lights are carried in frames J secured to each other by pins K on one working in vertically arranged slots $J'$ in the other so as to adjust themselves by gravitation to the varying height of the structure, weather-tightness being secured by fixing the outermost of the light frames to the flanges $A^2$ on the roof beams A, as shown in Fig. 3, the others being then, as shown in Fig. 5, arranged stepwise inward from top to bottom of the structure. This will be clear by an examination of the end view of the lights shown in Fig. 5, which corresponds to the right hand side of the end view of the structure shown in Fig. 3.

Having fully described my invention, what I claim and desire to secure by Letters Patent is:—

1. A greenhouse comprising a plurality of foundation plates forming a base, a right and left handed screw-threaded rod rotatably mounted on each of said foundation plates, nuts on said screw-threads, projections on said nuts, arms pivotally mounted to said projections and to the roof, and vertically movable side lights secured to said roof.

2. A greenhouse comprising a plurality of foundation plates forming a base, a right and left handed screw-threaded rod rotatably mounted on each of said foundation plates, nuts on said screw-threads, projections on said nuts, antifriction rollers mounted on said projections to run on the said foundation plates, arms pivotally mounted to said projections and to the roof, and vertically movable side lights secured to said roof.

3. A greenhouse comprising a plurality of foundation plates forming a base, a right and left handed screw-threaded rod rotatably mounted on each of said foundation plates, nuts on said screw-threads, projections on said nuts, antifriction rollers mounted on said projections to run on the said foundation plates, arms pivotally mounted to said projections and to the roof, and side lights secured to said roof and connected to each other vertically by pin and slot connections.

4. A greenhouse comprising a plurality of foundation plates forming a base, a right and left handed screw-threaded rod rotatably mounted on each of said foundation plates, nuts on said screw-threads, projections on said nuts, antifriction rollers mounted on said projections to run on the said foundation plates, arms pivotally mounted to said projections and to the roof, and side lights secured to said roof and connected to each other vertically by pin and slot connections with the uppermost on the outerside of the greenhouse and the others secured to the inside of the frame of the light next above.

5. A greenhouse comprising a plurality of foundation plates forming a base, a right and left handed screw-threaded rod rotatably mounted on each of said foundation plates, nuts on said screw-threads, projections on said nuts, antifriction rollers mounted on said projections to run on the said foundation plates, arms pivotally mounted to said projections and to the roof, side lights secured to said roof and connected to each other vertically by pin and slot connections with the uppermost on the outerside of the green house and the others secured to the inside of the frame of the light next above, and means for simultaneously rotating the said threaded rods.

In testimony whereof I have hereunto set my hand in presence of two subscribing witnesses this 19th day of January 1920.

JAN CORNELIS DE JONG.

Witnesses:
F. W. GOLBY,
B. GOLBY.